(No Model.)
C. L. KLAUDER.
CAR FENDER.
No. 551,972. Patented Dec. 24, 1895.
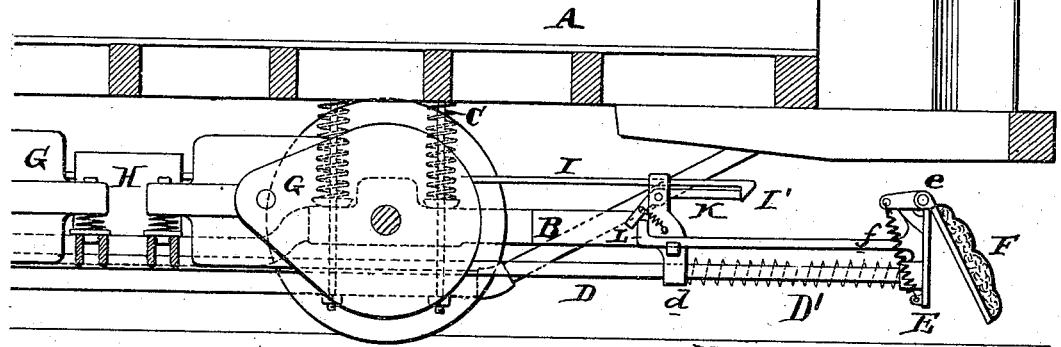
FIG. 1
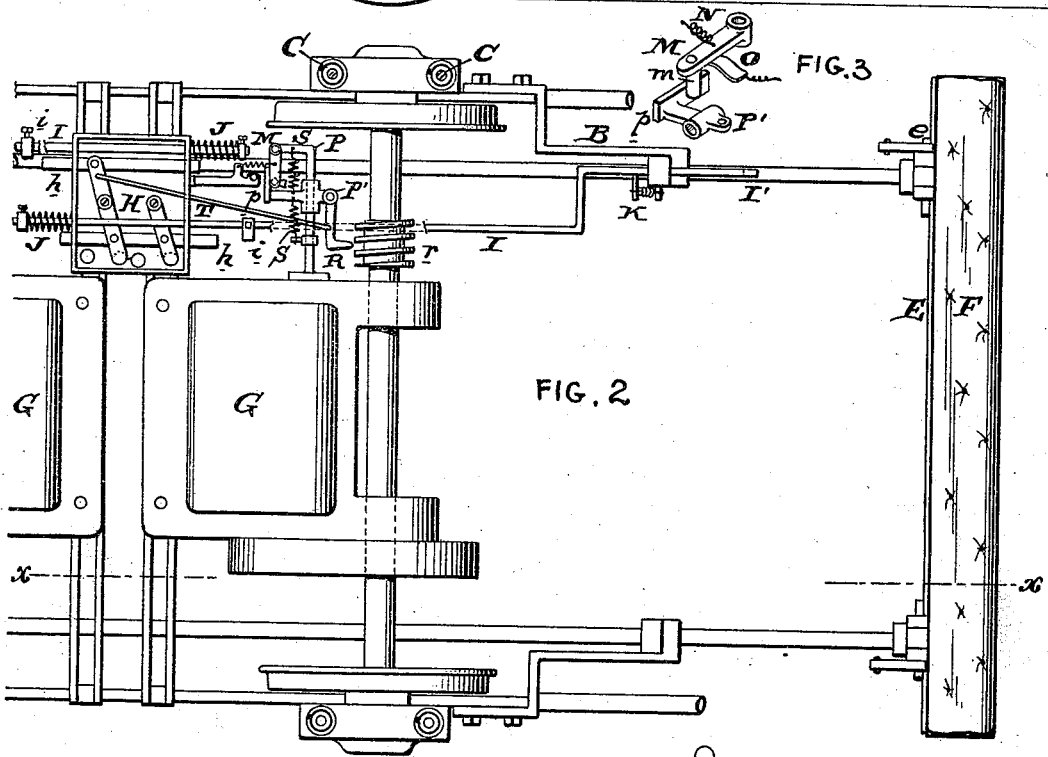
FIG. 2
FIG. 3
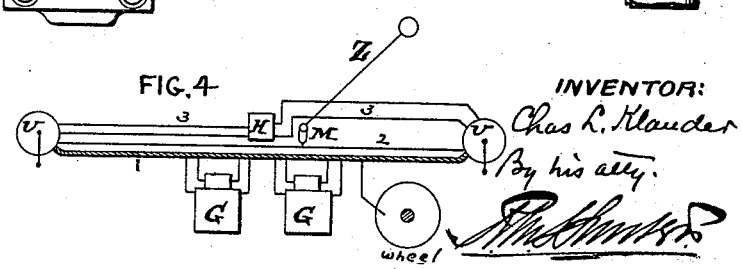
FIG. 4
WITNESSES:
INVENTOR:
Chas L. Klauder
By his atty.

UNITED STATES PATENT OFFICE.

CHARLES L. KLAUDER, OF PHILADELPHIA, PENNSYLVANIA.

CAR-FENDER.

SPECIFICATION forming part of Letters Patent No. 551,972, dated December 24, 1895.

Application filed November 23, 1894. Serial No. 529,705. (No model.)

*To all whom it may concern:*

Be it known that I, CHARLES L. KLAUDER, of the city and county of Philadelphia and State of Pennsylvania, have invented an Improvement in Car-Fenders, of which the following is a specification.

My invention has reference to fenders for electric and other cars; and it consists of certain improvements which are fully set forth in the following specification and shown in the accompanying drawings which form a part thereof.

My improvement comprehends the adaptation of a fender to an electrically or other propelled car in such manner that the fender is movably supported upon the track of the car and may be held stationary while the car runs forward upon it. Furthermore, the construction includes certain features wherein the relative movement between the fender and the car causes switch devices in the electric circuit leading to the motors to be automatically operated so as to control the operation of the motors. The switch devices preferably cause the motors to be reversed. The preferred switch devices comprise a current-reverser for the armature or field circuits of the motors, and a circuit-breaker, with the object in view of reversing the current in one element of the motors to cause the car-wheels to be rotated in the reverse direction and then to interrupt the circuit to arrest the car so as not to permit it to run far backward.

The various details are capable of being varied in numerous ways, and therefore those shown in the drawings are only illustrative of one manner of carrying out my improvements.

Referring to these drawings, Figure 1 is a sectional elevation of an electrically-propelled car on line $x\ x$ of Fig. 2. Fig. 2 is a plan view of my improved invention with the body of the car removed. Fig. 3 is a perspective view of one of the switches, and Fig. 4 is a diagram illustrating the arrangement of the circuits upon the car.

In the drawings but little more than one-half of the car structure is illustrated, but this will suffice, as the other end of the car is the same in all material respects as the end which is fully illustrated.

A is the car-body, and is supported upon the truck B by suitable springs C in the usual way. The truck B is carried upon the axles independent of the movements of the car-body A and is therefore at a fixed distance from the rails. Loosely supported in guides $d$ upon the truck-frame B are the rods D of the fender. The said rods extend the full length of the car and are connected at each end with the fender E arranged transversely or across the car. The fender is preferably provided with a padded portion F hinged to the fender structure at $e$ and normally held forward by a spring $f$, as clearly shown in Fig. 1. By this construction the lower part of the fender may be normally at a considerable distance above the rails and not liable to strike an obstruction. The instant, however, an object is struck the padded portion F is turned down close to the rails and prevents anything passing under it. If the object struck be sufficiently heavy to overcome the friction of the fender in its guides, the fender proper remains stationary and the car travels forward upon it. In practice the car may be made by properly proportioning the parts to move a distance equal to five or six feet before the wheels would be adjacent to the obstruction. This movement under ordinary control of the vehicle would permit the operator to apply the brakes to prevent excessive injury to the person forming the obstruction. Practice has shown, however, that the operators of electric cars in most cases cannot act quickly enough, or become demoralized by the danger to which the person is subjected and lose control of the car. I therefore prefer the control of the car to be automatic by the action of this fender. To do this I provide a current-reverser H for reversing the current in the armatures or fields of the motors. This switch H is provided with two slides $h$, one of which is acted upon by a block $i$ secured to the rod I controlled by the fender moving in one direction relatively to the car, and the other is operated by a similar block $i$ on a rod I controlled by the movement of the fender in the opposite direction. As illustrated, one of these rods is directed toward one end of the car and terminates in a shoulder I'. The other rod I would project in the opposite direction to the other end of the car and be provided with a similar shoulder. Springs J are employed to move the rods in a direction adapted to operate the switch when said rods are liberated. Normally the rods I are held out of action by triggers or locks K pivoted to the truck-frame B. These triggers are operated by arms L secured to the fender. It will be observed that if the fender is arrested while the car is moving forward, the trigger at the forward end will be tripped, and the rod I thereby liberated. The spring J will then move it backward, and the switch H will be shifted to reverse the motors. The rotation of the wheels of the car will then be in a direction adapted to cause the car to move backward, and even if the momentum was such as to carry the car forward with the wheels skidding, there would be no tendency to grind a person or object under the wheels, but rather that the wheels should clear themselves.

As the switch H is shifted to reverse the car, it moves a rod T, the said rod moving an arm R into contact with a worm r on the axle. The worm moves the arm R transversely to the car and thereby shifts the sleeve P' upon a guide P and moves a bolt p under a pin m of a circuit-breaking switch M, so that after one or more revolutions of the car-wheels the switch M is liberated and its spring N instantly causes it to be snapped off of the contact O and thereby break the electrical connection with the trolley Z. This is preferably only done after the motors have had full oportunity to reverse, and before they would have had a tendency to burn out by excessive duty put upon them. Springs S hold the bolt and its slide normally in an intermediate position so that no matter in which direction the axle rotates the operation of the circuit-breaking switch is assured.

The circuits commonly employed upon electrically-propelled vehicles are indicated in Fig. 4, in which U U represent the series multiple controllers at each end of the car, Z is the trolley, G G are the electric motors, 1 is the cable connecting the various motor-circuits with the controllers, and 2 is the trolley-circuit for supplying current to the controllers. M is the circuit-breaking switch before described. H is the current-reversing switch and is connected by circuits 3 3 with the controllers so as to reverse the armature or field circuits as may be desired without interfering with the ordinary functions of the controllers.

It is evident that a spring D' may be employed between the fender proper and the truck-frame, as indicated in dotted lines in Fig. 1, but this is not necessary in practice.

By my means the car is operated under normal conditions by the operator, and in case a person is struck the action thereof instantly throws the car automatically under control, first to reverse the rotation of the wheels to propel the car backward, and then to interrupt the circuit to prevent any possible injury to persons in the rear.

It is evident that the reversing-switch might be dispensed with, if desired, and the circuit-breaking switch alone employed, or vice versa; but for a perfect operation I prefer to employ both of these specific switches which constitute a complete circuit-controlling device.

It is evident that the mere details of my improvements are immaterial and may be greatly varied without in the least departing from the principles of my invention. Furthermore, while I have shown my invention applied to electric cars, it is adapted to vehicles propelled by other mechanical powers, in which case the switch would be substituted by the usual reversing devices and valves.

Having now described my invention, what I claim as new, and desire to secure by Letters Patent, is—

1. The combination with a mechanically propelled vehicle, of a fender loosely supported upon the vehicle and movable longitudinally thereon from the front rearwardly upon meeting an obstruction, an electric motor to propel the car forward, a reversing switch to reverse the action of the motor, a connection between the reversing switch and fender whereby the latter operates the switch upon meeting an obstruction for the purpose of reversing the operation of the motor to arrest the forward movement of the car, a circuit breaking switch, and automatic devices for operating said switch after the motor has made a given number of reversed revolutions to arrest the backward movement of the car.

2. The combination of a car, with a fender frame freely movable longitudinally and horizontally upon the truck thereof independently of the car body and projecting forward, a fender attached to the end of said frame consisting of an upright portion and a pivoted portion arranged obliquely forward but capable of turning backward to a vertical position and thereby projected toward the ground, and a spring to hold the said forward portion in an oblique position and permit it to have free elastic movement, the construction being such that upon striking an obstruction the forward portion of the fender is moved downward and the car moves freely forward upon the stationary fender frame.

3. In an electric car, the combination of an independent frame supported upon the axles independently of the car body, a hand regulator on the car body for controlling the motor, a reversing switch for reversing the motor carried upon the independent frame, a movable fender also supported by the independent frame and movable freely relatively thereto, a mechanical trip carried upon the independent frame for controlling the reversing switch, and a trip actuating device carried by the fender, whereby the car moves forward upon the fender after it has struck an obstruction and operates the trip to permit the reversing switch to be operated and the momentum of the car to be arrested without materially moving the fender.

In testimony of which invention I have hereunto set my hand.

CHAS. L. KLAUDER.

Witnesses:
ERNEST HOWARD HUNTER,
R. M. HUNTER.